(12) United States Patent
Masuda et al.

(10) Patent No.: US 7,614,243 B2
(45) Date of Patent: Nov. 10, 2009

(54) SUPER-CONDUCTIVE CABLE OPERATION METHOD AND SUPER-CONDUCTIVE CABLE SYSTEM

(75) Inventors: Takato Masuda, Osaka (JP); Hiroyasu Yumura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 427 days.

(21) Appl. No.: 10/549,578

(22) PCT Filed: Sep. 9, 2004

(86) PCT No.: PCT/JP2004/013120

§ 371 (c)(1),
(2), (4) Date: Sep. 19, 2005

(87) PCT Pub. No.: WO2005/029510

PCT Pub. Date: Mar. 31, 2005

(65) Prior Publication Data

US 2006/0180328 A1    Aug. 17, 2006

(30) Foreign Application Priority Data

Sep. 19, 2003   (JP) ............................. 2003-328780

(51) Int. Cl.
*F25B 41/00* (2006.01)
(52) U.S. Cl. .................. 62/113; 62/259.2; 174/15.5
(58) Field of Classification Search ............ 62/259.2, 62/50.1, 51.1, 50.7, 79, 113, 126, 132, 434; 174/15.1, 15.4, 15.5, 11 R, 28, 125.1; 505/100, 505/230, 231, 886, 889, 888
See application file for complete search history.

(56) References Cited

U.S. PATENT DOCUMENTS

| | | | | |
|---|---|---|---|---|
| 3,162,716 A | * | 12/1964 | Silver | 174/15.5 |
| 3,463,869 A | * | 8/1969 | Cooley et al. | 174/15.6 |
| 3,646,243 A | * | 2/1972 | Graneau et al. | 174/15.5 |
| 3,903,355 A | | 9/1975 | Rasquin | |
| 3,950,606 A | * | 4/1976 | Schmidt | 174/15.5 |
| 4,046,407 A | * | 9/1977 | Porreco | 285/123.17 |
| 4,189,930 A | * | 2/1980 | Davydov et al. | 62/502 |
| 4,796,433 A | * | 1/1989 | Bartlett | 62/47.1 |

(Continued)

FOREIGN PATENT DOCUMENTS

GB        1464564        2/1977

(Continued)

OTHER PUBLICATIONS

Copy and translation of Office Action from corresponding Russian Patent Application dated Dec. 25, 2007.

(Continued)

*Primary Examiner*—Mohammad M Ali
(74) *Attorney, Agent, or Firm*—Foley & Lardner, LLP

(57) ABSTRACT

A method of operating a superconducting cable using a conductor cooled by a refrigerant to transmit electric power causes a change in the refrigerant temperature to change the transmission capacity of a superconducting cable(110, 120, 130). Since superconducting materials are capable of increasing the value of their critical current as the temperature decreases, the refrigerant temperature may be changed to change the transmission capacity of the superconducting cable (110, 120, 130) without overdesigning of cabling or an additional cable.

20 Claims, 3 Drawing Sheets

U.S. PATENT DOCUMENTS

| | | | | |
|---|---|---|---|---|
| 5,193,349 | A | * | 3/1993 | Laverman et al. ............... 62/64 |
| RE36,332 | E | * | 10/1999 | Pierce et al. .................. 62/47.1 |
| 6,112,531 | A | | 9/2000 | Yamaguchi |
| 6,255,595 | B1 | * | 7/2001 | Metra et al. .............. 174/125.1 |
| 6,327,865 | B1 | * | 12/2001 | Bonaquist et al. .............. 62/79 |
| 6,354,087 | B1 | * | 3/2002 | Nakahara et al. .................. 62/6 |
| 6,640,557 | B1 | * | 11/2003 | Arman et al. ................ 62/50.7 |

FOREIGN PATENT DOCUMENTS

| | | |
|---|---|---|
| JP | 51-067983 | 6/1976 |
| JP | 2001-052542 | 2/2001 |
| JP | 2001-202837 | 7/2001 |
| RU | 2 087 956 C1 | 8/1997 |
| RU | 2000104114 A | 5/1999 |
| SU | 439874 | 4/1975 |

OTHER PUBLICATIONS

K. Iizuka, Power Cable Technology Handbook, New Edition, Mar. 25, 1989, $1^{st}$ Edition, First Copy, pp. 14-17.

Decision to Grant Dated Apr. 29, 2008 for related Russian patent application No. 2005133215/09(037182).

Search Report dated Jun. 27, 2008 for related European Patent Application No. 04787784.0-1231/1667172.

* cited by examiner

SUPER-CONDUCTIVE CABLE OPERATION METHOD AND SUPER-CONDUCTIVE CABLE SYSTEM

TECHNICAL FIELD

The present invention relates to a method of operating a superconducting cable and a superconducting cable system, and more particularly, to a method of operating a superconducting cable that provides increased capacity without an additional cable.

BACKGROUND ART

One transmission route using normal-conducting cables is composed of a plurality of circuits to accommodate a failure (e.g. Non-Patent Document 1). For example, one route may be composed of three circuits, where the maximum transmission capacity provided by all of the circuits may be 3E, with the maximum capacity of each cable circuit being 1.5E such that in the case of one circuit becoming unavailable due to a failure, the remaining two circuits are still capable of providing the transmission capacity of 3E.

Basically, when the power demand in a geographical area is expected to increase, transmission of electric power matching the increased demand can be only achieved by installation of an additional cable.

Non-patent Document 1: IIZUKA, Kihachiro, "Power Cable Technology Handbook, New Edition", Denkishoin Co., Ltd., Mar. 25, 1989, first edition, pp. 14-17

DISCLOSURE OF THE INVENTION

Problems to be Solved by the Invention

Conventional operations using normal-conducting cables exhibit following problems:

(1) Overdesigning of cabling which causes increase in cost of cabling.

The conventional techniques for a normal-conducting cable allow a transmission capacity of 3E using three circuits during normal operation, the transmission capacity per circuit being E. However, considerations of transmission capacity upon a failure call for a design capacity per cable of 1.5E, which entails an excess in designing over that for the normal capacity. This results in an increase in the cost of cabling.

(2) Additional cable may not be easily installed.

In some countries, newly installing a transmission line with a voltage of a predetermined value or more may require consent of inhabitants living close to the installation site. In such a case, an additional cable cannot be easily installed even when an increase in the power demand is expected, causing difficulty in accommodating the increased demand, and if the additional installation is allowed, it will naturally require a construction cost.

In light of the above, the major object of the present invention is to provide a method of operating a superconducting cable that allows regulating transmission capacity in an inexpensive manner, without overdesigning of cabling or an additional cable.

Another object of the present invention is to provide a superconducting cable system suitable for implementing the above method.

Means for Solving the Problems

To achieve the above objects, the present invention employs a superconducting cable with variable refrigerant temperature instead of maintaining a constant temperature.

A method of operating a superconducting cable according to the present invention uses a conductor cooled by a refrigerant to transmit electric power, characterized in that the refrigerant temperature is changed to change the transmission capacity of the superconducting cable.

In the conventional developments of superconducting cables, retaining a constant refrigerant temperature to stabilize the superconducting state of a conductor has been emphasized. However, a superconducting materials have the property of increasing their critical current as the temperature is decreased, as shown in the graph of FIG. 3. This graph shows the ratio of the critical current, Ic, and Ic0 (Ic/Ic0) against temperature, Ic0 being the critical current at 77 K, where the temperature of Bi2223 superconducting material is changed. That is, for a certain refrigerant temperature during normal operation (To), the refrigerant temperature may be reduced below To to increase the transmission capacity of a superconducting cable, whereas the refrigerant temperature may be increased above To to decrease the transmission capacity. In this way, the transmission capacity of a superconducting cable may be changed by a change in the refrigerant temperature.

Such variable transmission capacity may be utilized in several different modes. One mode concerns the case of increasing power demand, where the refrigerant temperature can be reduced below that for normal operation to increase the transmission capacity of a superconducting cable, thereby providing transmission of electric power that matches the increased power demand.

In some countries, newly installing a transmission line with a voltage of a predetermined value or more may require consent of inhabitants living close to the installation site, such that additional cables may not be easily installed when an increase in the power demand is expected, and when the installation of an additional cable is permitted, it requires enormous cost and time. The inventive method can perform transmission utilizing an existing superconducting cable and without an additional cable, such that the power capacity may be increased for small cost and in short time.

In the case of decreasing power demand, the transmission capacity of a superconducting cable may also be reduced by increasing the refrigerant temperature. This allows reducing the cost of cooling the superconducting cable and thus the cost required for operating the superconducting cable.

Of course, it is also possible to strategically combine decreasing and increasing in the refrigerant temperature, where the power demand from a load connected to the superconducting cable may be monitored and, based on the increase/decrease in the power demand, the refrigerant temperature may be decreased/increased to increase/decrease the power capacity.

Another mode of utilizing variable transmission capacity is related to the case where one of a plurality of superconducting cable circuits fails such that transmission is not possible on the failed circuit, in which case the transmission capacity of the remaining good circuit(s) may be increased above that prior to the failure. More specifically, when one of a plurality of superconducting cable circuits fails, the refrigerant temperature of the unfailed, good circuit(s) may be decreased below the temperature prior to the failure, thereby increasing the transmission capacity of the good circuit(s). The good circuit(s) after the failure transmit(s) electrical power greater than the corresponding capacity for transmission by the good circuit(s) prior to the failure.

For example, assuming that there are three superconducting cable circuits and the transmission capacity of each circuit is E, then the transmission with a capacity of 3E is normally possible. When one of the superconducting cable circuits fails and becomes unavailable, an operation with a constant refrigerant temperature would only allow transmission with a capacity of 2E. In light of this, the refrigerant temperature for the remaining two good circuits may be decreased to increase the transmission capacity of the good circuits above the pre-failure level (above 2E), thereby achieving more power (current) capacity.

For the above-mentioned modes, variable refrigerant temperature may be provided by several approaches.

One involves cooling the refrigerant using a refrigerator with high cooling capability in the first place. For example, if the refrigerant is liquid nitrogen and the refrigerant temperature for normal operation, To, is slightly below its boiling point, a refrigerator only needs to have the capability required to maintain To. When an increase in power demand or a failed circuit calls for an increase in the transmission capacity of the superconducting cables, the refrigerant needs to be cooled to a temperature not more than To. To achieve this, the refrigerator may be capable of cooling substantially down to the freezing point of the refrigerant. When the refrigerant is cooled below the freezing point, it solidifies and cannot be circulated. Consequently, the refrigerator only needs to be capable of cooling substantially down to the freezing point of the refrigerant.

Alternatively, refrigerant may be interchangeable where a refrigerant with a higher freezing point may be replaced with another refrigerant with a lower freezing point, and a refrigerator may be used that is capable of cooling substantially equal to or below the freezing point of the refrigerant with the higher freezing point. For example, when the transmission capacity is to be increased during an operation using liquid nitrogen as a refrigerant with a higher freezing point, the refrigerant may be replaced with liquid air, i.e. a refrigerant with a lower freezing point, and the refrigerant temperature may be reduced below that for the operation with liquid nitrogen. This approach enables refrigerant temperature regulation in a wider range, such that the transmission capacity may be changed more broadly.

Such replacement of refrigerant, which may take several days, is more suitable for e.g. increasing the transmission capacity of a superconducting cable beforehand to accommodate expected future increase in the power demand, than for dealing with a failed one of a plurality of circuits by increasing the transmission capacity of the good circuits.

Further, when one of a plurality of circuits fails, the refrigerant for the good circuit(s) may be cooled utilizing the refrigerator for the failed circuit as well. More specifically, when there are a plurality of superconducting cable circuits, each having its own refrigerant for cooling the refrigerant, and one of the circuits fails, both the refrigerator for the failed circuit and that/those for the good circuit(s) are used to cool the refrigerant for the good circuit(s) to a temperature below that prior to the failure. This approach preconditions that the refrigerator for a failed circuit remains available while the superconducting cable in that circuit is not available due to the failure. For example, when one of three superconducting cable circuits becomes unavailable, the refrigerators for all of the circuits, i.e. three refrigerators, may be used to cool the refrigerant for the remaining two good circuits, thereby providing more effective cooling of the refrigerant.

In any of the above cases, the refrigerant may be any fluid capable of being cooled to a temperature required to maintain a conductor in a superconducting state. Particularly, materials with larger difference between their boiling and freezing points are preferable since they allow the transmission capacity of a superconducting cable to be changed with a broader range by a change in the refrigerant temperature while maintaining the refrigerant in the liquid state. The difference between boiling and freezing points is desirably 5° C. or greater, and more preferably 10° C. or greater. Typically, liquid nitrogen, liquid air, liquid hydrogen, liquid neon, liquid helium, or liquid oxygen may be utilized. Particularly, liquid air has a boiling point of about 79 K and a freezing point of 55 K and exhibits a large difference between the boiling and freezing points, and has a freezing point below that of liquid nitrogen (boiling point at about 77 K and freezing point at about 63 K), and thus is a preferable refrigerant for increasing the transmission capacity of a superconducting cable. It should be noted that any of the boiling and freezing points indicated herein is a value measured under atmospheric pressure.

An aspect of a superconducting cable system using the inventive method is characterized by: a superconducting cable; a cooling mechanism that cools a refrigerant for use with the superconducting cable; a circulating mechanism that circulates the refrigerant cooled by the cooling mechanism to the superconducting cable; and a refrigerant temperature control mechanism that regulates the refrigerant's temperature based on a power demand from a load connected to the superconducting cable.

The cooling mechanism may be a refrigerator that cools the refrigerant. Typically, the circulating mechanism may be a pump. The refrigerant temperature control mechanism may have a load current sensing means and a temperature control means controlling the temperature in the cooling mechanism based on the load current measured by the sensing means.

Another aspect of a superconducting cable system using the inventive method is characterized by: a plurality of superconducting cables; cooling mechanisms that cool a refrigerant for use with the superconducting cables; circulating mechanisms that circulate the refrigerant cooled by the cooling mechanisms to the superconducting cables; and refrigerant route switching mechanisms which, upon one of the superconducting cables becoming unavailable, block supply of the refrigerant to the unavailable cable while allowing supply of the refrigerant to the remaining good superconducting cable(s).

The refrigerant route switching mechanisms may include pipings that provide joined refrigerant routes between the superconducting cables on the refrigerant outletting side of the cooling mechanism and on the refrigerant inletting side of the circulating mechanism, and a valve provided on the piping or along the extension thereof for blocking supply of the refrigerant to the unavailable superconducting cable.

Effects of the Invention

As described above, the inventive method of operating a superconducting cable allows regulating the transmission capacity of the cable in an inexpensive manner and without overdesigning of cabling or an additional cable.

Further, the inventive superconducting cable system is suitable for implementing the above method.

DESCRIPTION OF THE REFERENCE SIGNS 10 former, 20 conducting layer, 30 electrically insulating layer, 40 magnetic shielding layer, 50 protecting layer, 60 thermal insulating tube, 61 inner corrugated tube, 62 outer corrugated tube, 70 anticorrosive layer, 110, 120, 130 superconducting cables, 211-213 refrigerators, 221-223 pumps, 231-233, 241-243, 251, 252, 261-263 valves, 271-273 load current sensing means, 281-283 temperature control means.

BEST MODES FOR CARRYING OUT THE INVENTION

Embodiments of the present invention are described below. Prior to the description of the inventive method of operating a superconducting cable, a superconducting cable line in which the inventive method may be used will be described.

[Superconducting Cable Line]

Figure 1:
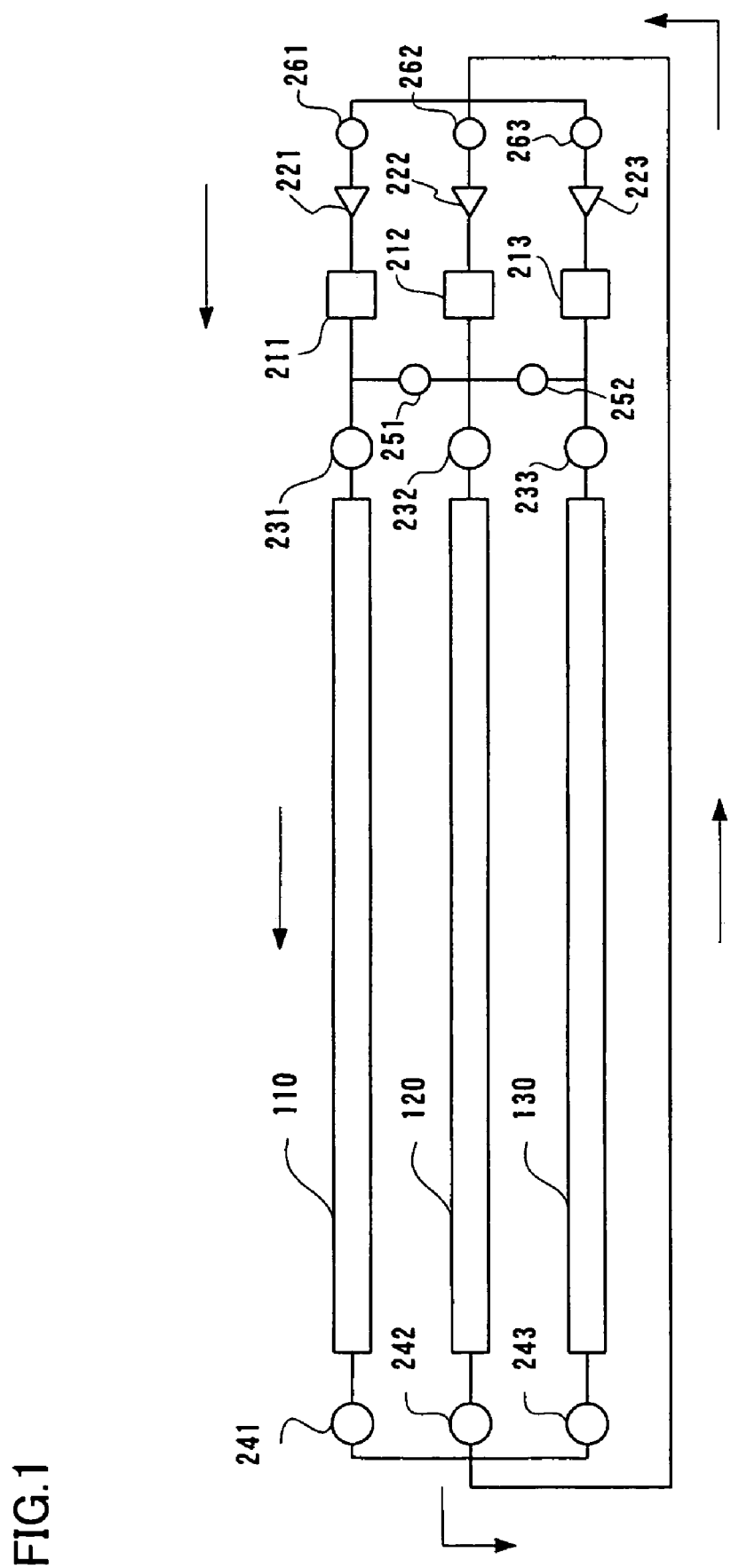
FIG. 1 is a schematic view of an inventive superconducting cable system.

A schematic view of the inventive superconducting cable system is shown in FIG. 1. Referring to FIG. 1, the line includes three superconducting cable circuits 110, 120 and 130 and a cooling system that circulates refrigerant to be supplied to superconducting cable circuits 110, 120 and 130. Although not shown in FIG. 1, superconducting cables 110, 120 and 130 have one end connected to a power supply and the other end connected to a load.

(Superconducting Cable)

Figure 2:
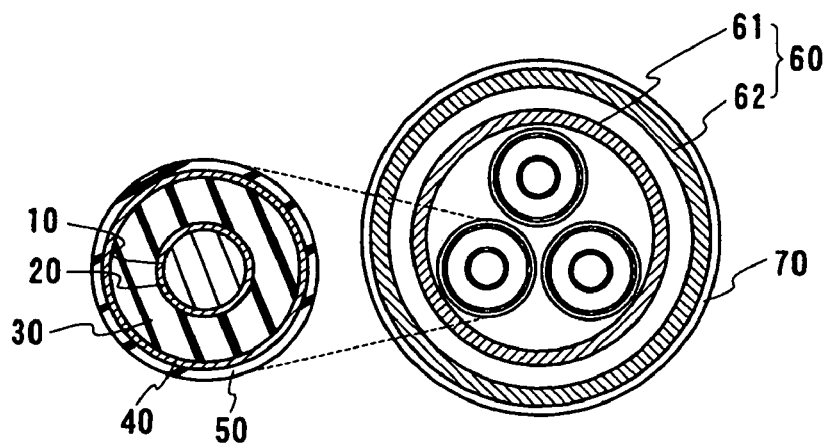
FIG. 2 is a cross sectional view of a superconducting cable used in the line of FIG. 1.

FIG. 2 shows a cross sectional view of a three-core integrated superconducting cable for use in the circuits in the line of FIG. 1. Referring to FIG. 2, the cable is configured with three cores contained within a thermal insulating tube. One cable circuit is constructed of three phases, each phase corresponding to one core. Each core includes, to list from the center toward the outside, a former 10, a conducting layer 20, an electrically insulating layer 30, a magnetic shielding layer 40, and a protective layer 50, where conducting layer 20 and magnetic shielding layer 40 are made of superconducting wire.

<Former>

Former 10 may be a solid one made of twisted metal wire, or may be a hollow one, for which a metal pipe may be used. One example of a solid former is a plurality of copper wires twisted together. A former constructed of twisted wire can achieve the reduction in alternating current loss as well as the minimization of the temperature increase due to overcurrent. If a hollow former is used, its interior can serve as a channel for the refrigerant.

<Conducting Layer>

A suitable conducting layer 20 is a tape wire having a plurality of oxide high-temperature superconducting filaments covered with a silver sheath. Bi2223 tape wire was used herein. The tape wire is wound around the former in multiple layers to form a conducting layer 20. Conducting layer 20 has a different twist pitch of the superconducting wire for each of its layers. In addition, the winding direction may be changed for each or every several of its layers such that even current flows homogeneously among the layers.

<Inter-layer Insulating Layer (Not Shown)>

An inter-layer insulating layer is provided between the innermost superconducting layer within conducting layer 20 and former 10, between each of the layers forming conducting layer 20, and between each of the layers forming magnetic shielding layer 40. An inter-layer insulating layer is constructed of a craft paper wound around the respective one of the layers of conducting layer 20 or around the respective one of the layers of magnetic shielding layer 40. The inter-layer insulating layer allows the layers of conducting layer 20 and magnetic shielding layer 40 to be electrically independent from each other.

<Electrically Insulating Layer>

An electrically insulating layer 30 is provided around conducting layer 20. Insulating layer 30 may be constructed of, for example, a craft paper laminated with a resin film of e.g. polypropylene (PPLP (R) from Sumitomo Electric Industries, Ltd.), which is wound around conducting layer 20.

<Magnetic Shielding Layer>

An alternating-current superconducting cable includes a magnetic shielding layer 40 provided outside insulating layer 30 for shielding magnetic field. Magnetic shielding layer 40 is formed of a superconducting wire similar to that for the conducting layer wound outside insulating layer 30. An electric current of a magnitude substantially the same as that for conducting layer 20 and in the opposite direction is induced in magnetic shielding layer 40 to cancel the generation of magnetic field in the outside.

<Protective Layer>

Further, a protective layer 50 is provided on magnetic shielding layer 40. Protective layer 50 serves to mechanically protect magnetic shielding layer 40 and the structure further within, and is formed by winding a craft paper or cloth tape on magnetic shielding layer 40.

<Thermal Insulating Tube>

Thermal insulating tube 60 is of a double-tube structure having an inner corrugated tube 61 and outer corrugated tube 62. Typically, a space is established between inner and outer corrugated tubes 61 and 62, and vacuum is applied to the space. Superinsulation (trade name) is disposed within the vacuum-applied space for reflection of radiant heat. The space defined by inner corrugated tube 61 and the cores may be utilized as a refrigerant channel. For example, go and return refrigerant channels may be formed by the space within a hollow former and the space within the inner corrugated tube. Further, an anticorrosive layer 70 of e.g. polyvinyl chloride is provided on the outer corrugated tube.

(Cooling System)

Referring to FIG. 1, the cooling system includes: refrigerators 211-213 that cool a refrigerant; pumps 221-223 that circulate the refrigerant; refrigerant piping connecting the refrigerators or pumps with superconducting cables 110, 120 and 130; and a plurality of valves 231-233, 241-243, 251, 252, 261-263 provided on the refrigerant piping.

In this cooling system, the refrigerant cooled by refrigerators 211-213 is moved by pumps 221-223 to be circulated to superconducting cables 110, 120 and 130 for the cooling of the superconducting wire. The numbers of refrigerators 211-213 and pumps 221-223 used here correspond to the number of circuits. Specifically, three refrigerators 211-213 and three pumps 221-223 are used, each refrigerator connected in series with the associated pump via piping. The piping extending from the refrigerator on the refrigerant outletting side is connected to one end of superconducting cables 110, 120 and 130 via valves 231-233, where pipes between refrigerator 221 and valve 231, between refrigerator 212 and valve 232, and between refrigerator 213 and valve 233 are connected with each other to provide a joined refrigerant route between the circuits, and valves 251 and 252 are provided on the joining piping. The other end of each superconducting cable 110, 120, 130 is connected with refrigerant outletting piping, which is integrated via valves 241-243 and led to pumps located at the one end of the cables. The integrated piping led to the pumps is branched into three that are connected to respective pumps 221-223 via valves 261-263. Thus, joined refrigerant routes may be provided on the refrigerant outletting side of refrigerators 211-213 and on the refrigerant inletting side of pumps 221-223, thereby moving the refrigerant cooled by any one of refrigerators 211-213 to any one of superconducting cable circuits 110-130.

In the present example, the refrigerant is liquid air (boiling point: about 79 K, freezing point: 55 K), and each of refrigerators 211-213 is capable of cooling down to the freezing point of liquid air.

Figure 4:
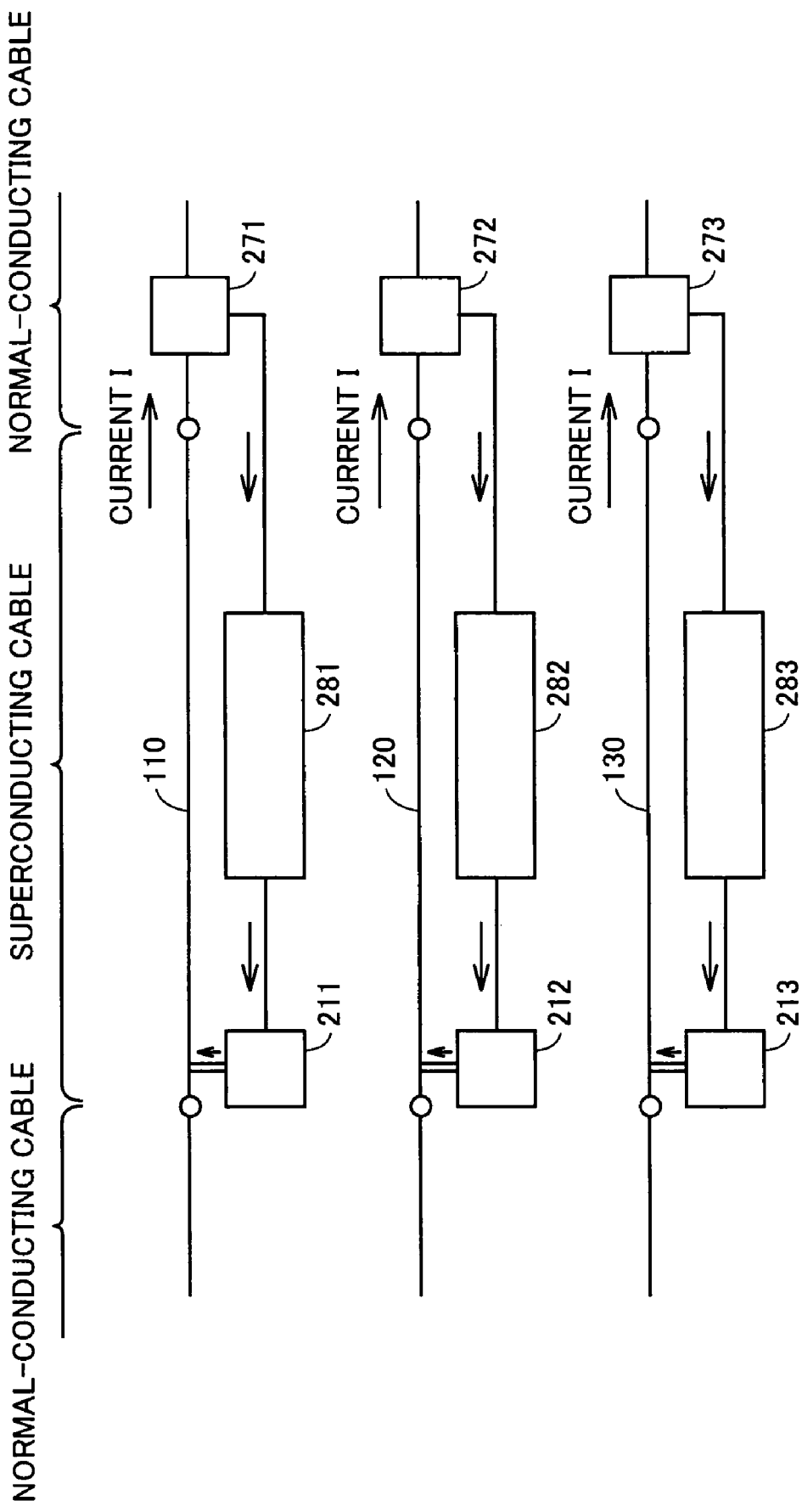
FIG. 4 illustrates a load current sensing means and a temperature control means.

Optionally, a refrigerant temperature control mechanism may be provided that regulates the refrigerant temperature based on the power demand from the load connected to superconducting cables 110, 120 and 130. FIG. 4 illustrates a load current sensing means and a temperature controlling means which form the refrigerant temperature control mechanism. Referring to FIG. 4, a normal-conducting cable is connected to the both ends of superconducting cables 110, 120 and 130. Load current sensing means 271, 272 and 273 are provided on those of the normal-conducting cables closer to the load to measure the load current. Load current sensing means 271, 272 and 273 are connected with respective temperature control means 281, 282 and 283. Temperature control means 281, 282 and 283 control the temperature of the refrigerant in their respective refrigerators 211, 212 and 213 based on the value of the load current measured by the respective load current sensing means 271, 272 and 273.

Note that in FIG. 4, the double lines between refrigerators 211, 212 and 213 and respective superconducting cables 110, 120 and 130 indicate the routes of refrigerant. The single lines between load current sensing means 271, 272 and 273 and respective temperature control means 281, 282 and 283 indicate the routes of a sense signal, while the single lines between temperature control means 281, 282 and 283 and respective refrigerators 211, 212 and 213 indicate the routes of a control signal.

[Method of Operation]

First Embodiment

A method of operation based on a change in the power demand from the load connected with the superconducting cable will be described below.

Figure 3:
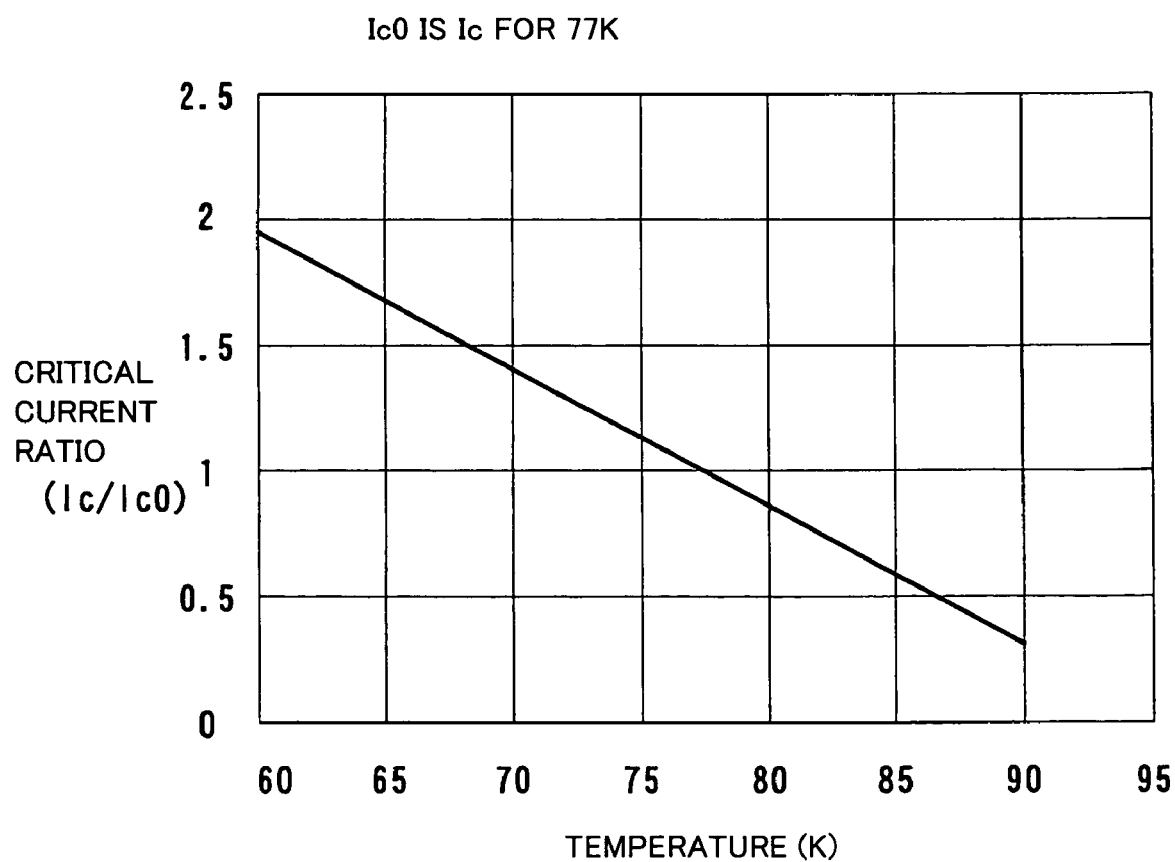
FIG. 3 is a graph showing the critical current ratio against the temperature for a superconductor.

In the line of FIG. 1, during normal operation, the refrigerant temperature is slightly below 77 K, for example, and all the circuits are being operated. During such normal operation, valves 251 and 252 provided on the joining piping for the refrigerant routes for the circuits are closed, while other valves 231-233, 241-243 and 261-263 are all open, such that refrigerators 211-213 cool the refrigerant for their respective superconducting cable circuits 110, 120 and 130. When the power demand from the load increases, the temperature set for refrigerators 211-213 is regulated to reduce the refrigerant temperature. For example, as apparent from the graph in FIG. 3, the cooling to around 68 K will result in a critical current that is 1.5 times that in normal operation. Typically, electric power is transmitted at a constant voltage. A 1.5-time increase in current capacity can thus increase the transmission capacity by 1.5 times. Further, the cooling to 60 K or below will result in a critical current that is two times that in normal operation, allowing transmission with yet greater capacity.

Thus, the present method of operation reduces the refrigerant temperature to achieve in a simple manner a transmission capacity around two times that in normal operation. Particularly, existing superconducting cables can be advantageously utilized to increase the power capacity for transmission without an additional cable.

Further, when the power demand decreases, the transmission capacity of the superconducting cables may be reduced by increasing the refrigerant temperature. Although this requires a superconducting wire capable of maintaining the superconducting state at the increased refrigerant temperature, the cost of cooling a superconducting cable may be decreased, resulting in reduced cost required for the operating the superconducting cable.

Moreover, the load current, Ip, may be measured and the refrigerant temperature T may be variably regulated such that Ip=α×Ic (α is the tolerance where α<1), Ic being the critical current of the superconducting cable. This approach performs an operation at the highest possible refrigerant temperature depending on the tolerance between the load current and the critical current, in order to reduce the load on the cooling system. Naturally, the refrigerant temperature is regulated between the boiling and freezing points of liquid air.

Second Embodiment

Now, description is provided of the case where one circuit fails and becomes unavailable and remaining good circuits perform the transmission. Assume that one of the three superconducting cable circuits shown in FIG. 1, 130, fails and becomes unavailable and transmission is only possible with the remaining two circuits. It is further assumed that while the superconducting cable in the failed circuit 130 is unavailable, the entire cooling system is good and available.

Initially, the open-and-close states of the various valves during normal operation prior to a failure are the same as those in the first embodiment.

When superconducting cable 130 becomes unavailable, three refrigerators 211-213 and three pumps 221-223 are used to supply refrigerant to the two good circuits (superconducting cables 110 and 120) and cool the refrigerant to a yet lower temperature with a sufficient cooling capacity. For this purpose, refrigerant supply valve 233 and refrigerant outletting valve 243 of the failed circuit are closed to separate the failed circuit from the cooling system, while valves 251 and 261 on the joining pipings are opened and all pumps 221-223 are driven to circulate the refrigerant. In this way, the refrigerant introduced to the two good circuits is cooled/circulated by virtue of three refrigerators 211-213 and three pumps 221-223.

According to this method, a cooling system capable of supplying refrigerant to three circuits may be used to supply refrigerant to two circuits, providing effective cooling of refrigerant. As a result, the refrigerant temperature may be easily reduced below that prior to a failure, thereby achieving increased transmission capacity of the good circuits. For example, when each circuit is operated at a refrigerant temperature slightly below 77 K prior to a failure, the refrigerant temperature of the good circuits after a failure may be about 68 K to ensure a transmission capacity that is about 1.5 times that prior to the failure per circuit, such that the two good circuits can provide transmission with a capacity that matches that of the three circuits prior to the failure.

Of course, two refrigerators and two pumps may circulate refrigerant to be supplied to two good circuits where each refrigerator may be capable of cooling the refrigerant for one circuit to an increased-capacity-operation temperature (about 68 K). In this case, valves 233 and 243 at the ends of the failed circuit are closed to separate the failed circuit from the cooling system. Further, valve 263 located on the refrigerant inletting side of pump 223 is closed to separate refrigerator 213 and pump 223 from the cooling system. Refrigerators 211, 212 and pumps 221, 222 are then used to cool/circulate the refrigerant for superconducting cables 110, 120.

It should be understood that the disclosed embodiments above are, in all respects, by way of illustration and example only and are not by way of limitation. The scope of the present invention is set forth by the claims rather than the above description and is intended to cover all the modifications within the spirit and scope equivalent to those of the claims.

INDUSTRIAL APPLICABILITY

The present invention provides variable refrigerant temperature to change the transmission capacity of a superconducting cable during operation. Thus, when power demand is expected to increase, the increased demand may be accommodated without an additional cable or, when one of a plurality of circuits fails and transmission is only possible with the remaining circuits, transmission may be performed at a transmission capacity that is equal to or close to the pre-failure level. Consequently, the present invention may be effectively utilized in areas where electric power is to be supplied.

The invention claimed is:

1. A method of operating a superconducting cable for transmitting electric power using a superconducting cable of a first and second circuits comprising:
    cooling said superconducting cable of said first and said second circuits with a refrigerant, each of said first and second circuits having a respective refrigerator arranged in a refrigerant flow path on an upstream side of both of said superconducting cables of said first and second circuits, said flow path of said first and second circuits being connected to each other on the upstream side of said refrigerators, and said flow path of said first and second circuits being connected to each other on an downstream side of said superconducting cable; and
    controlling the cooling by cooling said superconducting cable of said second circuit with refrigerant cooled by both of the refrigerators for said first and said second circuits.

2. The method of operating a superconducting cable according to claim 1, characterized in that when a power demand from a load connected with the superconducting cable increases, the refrigerant temperature is reduced to increase the transmission capacity of the superconducting cable to transmit electric power matching the power demand.

3. The method of operating a superconducting cable according to claim 1, characterized in that when a power demand from a load connected with the superconducting cable decreases, the refrigerant temperature is increased to decrease the transmission capacity of the superconducting cable to transmit electric power matching the power demand.

4. The method of operating a superconducting cable according to claim 1, characterized in that when one of the circuits fails, the refrigerant temperature of the good circuit is reduced below the temperature prior to the failure to increase the transmission capacity of the good circuit.

5. The method of operating a superconducting cable according to claim 4, characterized in that the refrigerant of the good circuit is cooled to a lower temperature than the temperature of the refrigerant prior to the failure.

6. The method of operating a superconducting cable according to claim 1, characterized in that a refrigerator capable of cooling substantially down to the freezing point of the refrigerant is used to change the refrigerant temperature between the boiling point and the freezing point of that refrigerant.

7. The method of operating a superconducting cable according to claim 1, characterized in that a high freezing point refrigerant is replaced with a low freezing point refrigerant and a refrigerator is used capable of cooling substantially down to or below the freezing point of the high freezing point refrigerant and the low freezing point refrigerant's temperature is changed between the boiling point and the freezing point of this refrigerant.

8. The method of operating a superconducting cable according to claim 1, characterized in that the refrigerant is one of liquid nitrogen, liquid air, liquid hydrogen, liquid neon, liquid helium, and liquid oxygen.

9. A superconducting cable system comprising
    a plurality of superconducting cables connected by a parallel refrigerant flow path;
    a plurality of cooling mechanisms that cool a refrigerant and are operatively coupled to each of said parallel refrigerant flow paths;
    circulating mechanisms that circulate the refrigerant cooled by the plurality of cooling mechanisms to the superconducting cables;
    wherein the refrigerant flow path comprises a plurality of first pipes located on an upstream side with respect to said superconducting cable to provide the refrigerant to said superconducting cable; a plurality of second pipes located on a downstream side with respect to said superconducting cable to allow the refrigerant that has cooled said superconducting cable to pass through; wherein the plurality of first pipes are connected to each other and said plurality of second pipes are connected to each other; and
    refrigerant route switching mechanisms are configured to allow a cooling mechanism of a failed superconducting cable to supply refrigerant to a remaining operational superconducting cables.

10. The superconducting cable system according to claim 9, wherein the connected second pipes are adapted to route the refrigerant to the connected first pipes.

11. The superconducting cable system according to claim 9, wherein the refrigerant route switching mechanisms are located on both upstream and downstream from the cooling mechanisms.

12. The superconducting cable system according to claim 11, wherein the refrigerant route switching mechanisms are located downstream from the plurality of superconducting cables.

13. A method of operating a superconducting cable comprising:
    providing a first and second superconducting circuits having a superconductor cooled by a refrigerant having a refrigerant conveyed in a flow path;

providing a first refrigerator for the first superconducting circuit, the first refrigerator being located upstream from the first superconducting circuit in the refrigerant flow path;

providing a second refrigerator for the second superconducting circuit, the second refrigerator being located upstream from the second superconducting circuit in the refrigerant flow path;

providing a parallel refrigerant flow path for the refrigerant by connecting the flow path of the refrigerant upstream from the first and second refrigerators and downstream from the first and second superconducting circuits; and cooling the first superconducting cable with the refrigerant from the first and second refrigerator by separating the refrigerant flow path for the second superconducting circuit from the refrigerant flow path for the first superconducting circuit flow.

14. The method of operating a superconducting cable according to claim 13, characterized in that when a power demand from a load connected with the superconducting cable increases, the refrigerant temperature is reduced to increase the transmission capacity of the superconducting cable to transmit electric power matching the power demand.

15. The method of operating a superconducting cable according to claim 13, characterized in that when a power demand from a load connected with the superconducting cable decreases, the refrigerant temperature is increased to decrease the transmission capacity of the superconducting cable to transmit electric power matching the power demand.

16. The method of operating a superconducting cable according to claim 13, characterized in that
when one of the circuits fails, the refrigerant temperature of the good circuit is reduced below the temperature prior to the failure to increase the transmission capacity of the good circuit.

17. The method of operating a superconducting cable according to claim 16, characterized in that the refrigerant of the good circuit is cooled to a lower temperature than the temperature of the refrigerant prior to the failure.

18. The method of operating a superconducting cable according to claim 13, characterized in that a refrigerator capable of cooling substantially down to the freezing point of the refrigerant is used to change the refrigerant temperature between the boiling point and the freezing point of that refrigerant.

19. The method of operating a superconducting cable according to claim 13, characterized in that a high freezing point refrigerant is replaced with a low freezing point refrigerant and a refrigerator is used capable of cooling substantially down to or below the freezing point of the high freezing point refrigerant and the low freezing point refrigerant's temperature is changed between the boiling point and the freezing point of this refrigerant.

20. The method of operating a superconducting cable according to claim 13, characterized in that the refrigerant is one of liquid nitrogen, liquid air, liquid hydrogen, liquid neon, liquid helium, and liquid oxygen.

* * * * *